United States Patent Office 3,402,270
Patented Sept. 17, 1968

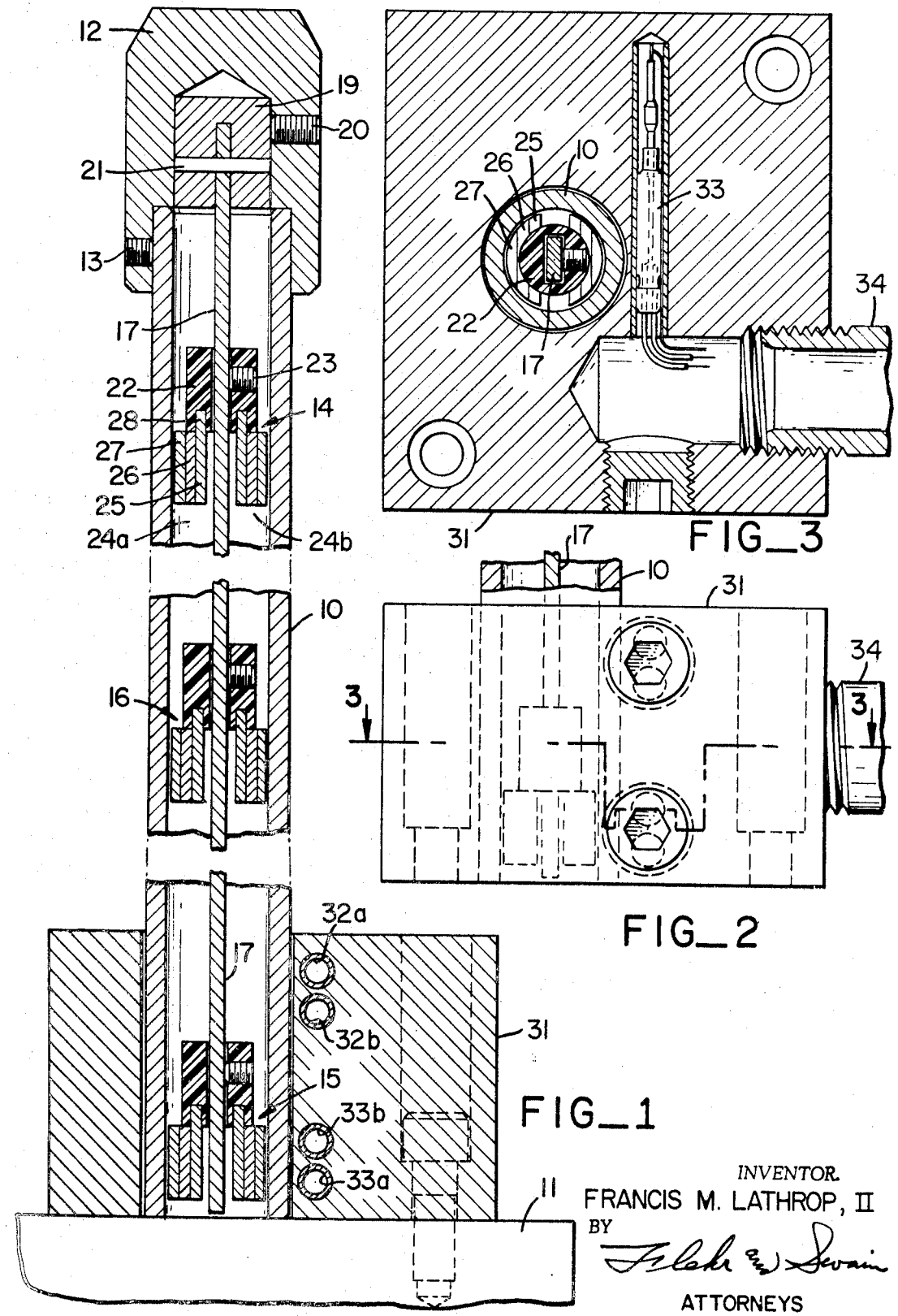

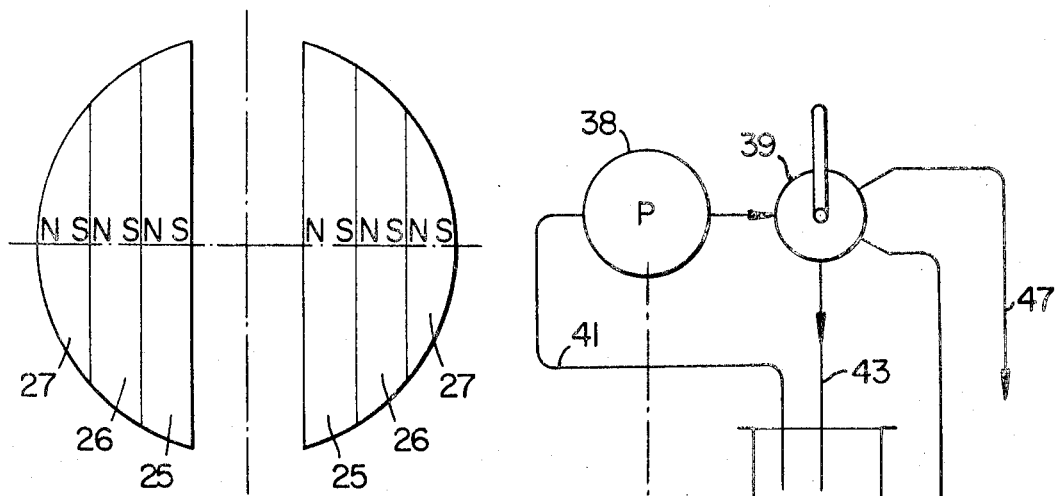
FIG_5
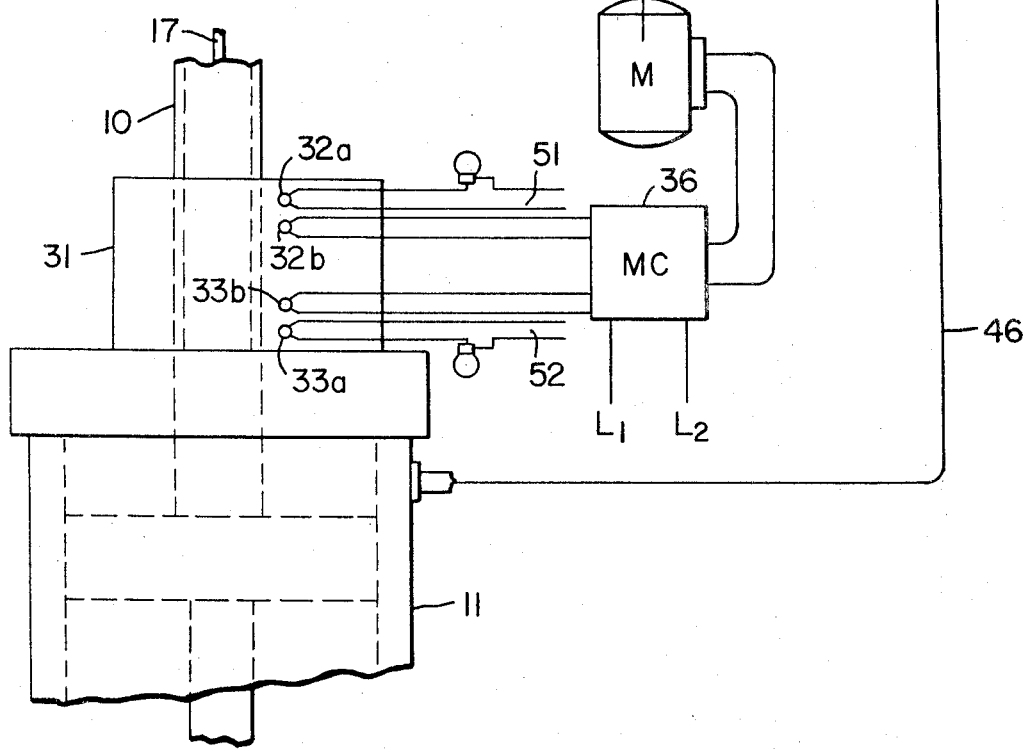
FIG_4
INVENTOR.
FRANCIS M. LATHROP, II
BY
ATTORNEYS

3,402,270
ELECTRICAL POSITIONING APPARATUS
Francis M. Lathrop II, Houston, Tex., assignor, by mesne assignments, to M.J. Valve Company, Houston, Tex., a corporation of Delaware
Continuation-in-part of application Ser. No. 483,132, Aug. 27, 1965. This application July 11, 1966, Ser. No. 564,150
4 Claims. (Cl. 200—82)

ABSTRACT OF THE DISCLOSURE

Apparatus responsive to the positioning of a member (e.g., the gate of a valve) being operated by a hydraulic cylinder-piston assembly. A tube of non-magnetic material is attached to the piston. A magnetic device is located within the tube and forms a magnetic field polarized transversely of the axis of the tube. An electric switch of the magnetic reed type is mounted exterior of the tube and is operated by the magnetic flux field.

---

This application is a continuation-in-part of my copending application S.N. 483,132, filed Aug. 27, 1965, now abandoned, and entitled, "Electrical Positioning Apparatus."

The invention relates generally to electrical apparatus which serves to indicate and/or determine the position of a member that is subject to reciprocation. More particularly, it relates to such apparatus applied to valves that are equipped with power operators.

It is frequently desirable to employ limiting or indicating switches in conjunction with the reciprocating parts of various equipment. The switches may serve to determine or fix the positions where movement of a part is arrested, or may operate indicators which visually indicate the position of the parts involved. Particularly, in the power operation of valves made in the larger sizes, it is common to use limiting switches to determine the full open and closed positions of the valve parts, and also in some instances to indicate or determine one or more intermediate positions. In a typical installation of this type, the power operator may consist of an electric motor that is geared mechanically or connected through hydraulic means with the valve gate. Switches are located to be operated by moving parts whereby they control and automatically stop the motor when the valve gate reaches a predetermined position, such as full open or closed positions. The same or separate switches may be used for controlling indicating circuits whereby pilot lights or other visual indicating means are operated. Having reference particularly to the valve industry, switch arrangements such as have been used in the past have not been satisfactory and have been subject to a number of disadvantages. Parts of the equipment have been unduly exposed, with the result that they have been subject to malfunctioning under adverse conditions. They have not been well adapted to marine or submarine installations where the entire valve and the associated equipment is emmersed in water or buried in the earth. A further disadvantage of prior arrangements has been that adjustments are somewhat difficult to make particularly under field operating conditions.

In general it is an object of the present invention to provide improved apparatus of the above character which is applicable to a variety of industrial equipment, including particularly valves having power operators.

Another object of the invention is to provide apparatus of the above character which can be made relatively immune to external conditions, including immersion in water.

Another object of the invention is to provide apparatus of the above character which can be readily adjusted either at the plant or under field conditions.

Additional objects and features of the invention have been set forth in detail in conjunction with the accompanying drawing.

Referring to the drawing:

FIGURE 1 is a side elevational view in section illustrating apparatus incorporating the present invention and applicable in particular to valve operators;

FIGURE 2 is an end view showing mounting means for the limiting switches;

FIGURE 3 is a cross-sectional view taken along the line 3—3 of FIGURE 2;

FIGURE 4 is a schematic diagram illustrating power operating apparatus of the hydraulic type for a valve, together with my invention; and FIGURE 5 is a schematic view showing the magnet assemblies for one of the magnetic devices, and the polarization of the individual magnet assemblies.

Referring to FIGURE 1, I have shown a tube 10 made of relatively non-magnetic material, such as a suitable stainless steel. The lower end of this tube is shown extending into the upper end of the double-acting hydraulic cylinder 11. Within the cylinder the tube is attached to an operating stem (not shown). The other exterior end of the tube 10 is shown closed by the cap 12 which is removably retained upon the tube by suitable means such as the set screw 13. In a typical valve installation the hydraulic cylinder 11 is mounted upon the valve body, and the piston is directly connected to a movable valve member, such as a valve gate. Tube 10 is aligned with the center line of the cylinder and reciprocates with the piston. Suitable sealing means (not shown) prevents leakage between the cylinder 11 and the tube 10.

Within the tube 10 I provide the upper and lower magnetic devices 14 and 15, and in addition I may provide one or more intermediate magnetic devices 16. These magnetic devices are assembled upon a bar 17 which is aligned with the axis of tube 10 and attached at its upper end to the cap 12. The particular means of attachment illustrated consists of a plug 18 which is held within the cap 12 by set screw 20 and which in turn is attached to the bar 17 by pin 21.

Each of the magnetic devices consists of permanent magnet elements which are assembled to provide a flux field of such strength as to properly operate magnetic switches disposed exterior of the tube 10. The particular construction illustrated consists of a mounting collar 22 which is adjustably retained upon the bar 17 by set screw 23. Magnetic assemblies 24a and 24b are secured to the collar 22 and provide magnetic polarization on an axis that is lateral or transverse to the axis of the tube 10. The elements of each magnetic assembly may consist of a plurality of flat magnet elements 25, 26 and 27 which are polarized in the direction of their thickness and which may be retained together by suitable cement or by magnetic attraction. The upper end of element 25 is shown cemented or otherwise retained within a groove 28 formed in the lower end of the collar 22.

Although the magnet elements 25, 26 and 27 may be made of solid metal, it has been found desirable to use permanent magnet material of the type comprising a body formed of plastic material impregnated with divided magnetic material capable of retaining magnetism so that the body functions as a permanent magnet. Also the collar 22 should be made of a non-magnetic material such as a suitable plastic like nylon, in order to avoid direct magnetic shunting.

FIGURE 5 illustrates polarization of the various magnet elements, thus providing a relatively wide and intense flux field lateral of the axis of the tube.

It will be evident that the various magnetic devices can be adjusted to desired positions by removing the cap 12 together with the bar 17 and the magnetic devices assembled on the same, after which the magnetic devices can be adjusted to desired positions and then returned to the tube 10.

The magnetically operated switches used with the parts described above may be mounted within a block of non-magnetic material 31 which is secured to the top of the cylinder 11. Two switches which may be associated with the closed position of the valve are indicated at 32a and 32b, and two switches which may be associated with the open position of the valve are indicated at 33a and 33b. Preferably these switches are of the magnetic reed type having their operating parts enclosed within a sealed glass tube and being sensitive to a magnetic flux field to effect closure of their contacts.

The switches 32a and 33a can be secured to indicating means such as pilot light circuits. Switches 32b and 33b can function as limiting switches and can be associated with the control circuitry of electrical motors or other motive means used to effect operation of the valve. All of the wires leading from the switches are shown extended through the pipe 34.

Assuming that the magnetic device 16 is omitted, then when the parts are in the position shown in FIGURE 1, the magnetic flux field of the device 15 causes both the switches 33a and 33b to close their contacts. When the tube 10 moves downwardly whereby the magnetic device 14 is brought into proximity with the switches 32a and 32b, these switches are likewise operated to effect control of indicator circuitry and the electrical operating motor. In general, as the tube 10 moves upwardly to the limiting position shown in FIGURE 1, the magnetic field of device 15 first effects operation of the switch 33a, which can operate the indicator, and then operates the switch 33b to control the operating motor. Similarly, when tube 10 moves downwardly, switch 32a is first operated and then the contacts to switch 32b are closed. It will be evident that with an electrical operating motor geared or connected through hydraulic means to operate the valve, the operation of the limiting switches controls the motor to fix the limiting positions of the valve. These limiting positions can be adjusted by adjusting the location of the devices 14 and 15 upon the bar 17.

Assuming that one or more intermediate magnetic devices are employed, such as the device 16, then the switches can be operated at various intermediate positions of the valve, thereby causing movement of the valve to be arrested until the circuitry is conditioned for continued movement.

FIGURE 4 illustrates how the device shown in FIGURES 1–3 can be connected with associated parts. The limiting switches 32b and 33b are shown connected with a motor controller 36. An electric motor 37 is connected to and controlled by the controller 36 and serves to drive the hydraulic pump 38. The pump is connected with a suitable hydraulic system such as the four-way valve 39 and piping 41, 42 and 43 connecting the pump with the sump 44. Additional piping 46 and 47 connects the four-way valve 39 with the extremities of the double-acting hydraulic cylinder 11. As is well known to those familiar with hydraulic valve operators, when pump 38 is in operation, the four-way valve 39 can be moved from one position to another to deliver hydraulic liquid under pressure to one end or the other of the cylinder, permitting the other end to discharge into the sump 44. Thus hydraulic piston 48 within the cylinder 11 moves in one direction or the other to correspondingly move the tube 10. Additional electrical circuits 51 and 52 are shown connected with switches 32a and 33a and may include pilot lights to indicate the position of the valve.

It will be evident from the foregoing that my invention provides simple and effective means for controlling the reciprocation of a member, and particularly the hydraulic piston connected to a valve. The magnetic devices are totally enclosed within the tube 10 and therefore they are not exposed or subject to accidental injury. The cap 12 can be sealed with respect to the tube 10, thus excluding all water or foreign material from the interior of the tube. Thus the invention can be used under conditions where water or dirt might otherwise make the device inoperative, as for example, in marine or submarine installations.

I claim:

1. In electrical positioning apparatus, a tube made of relatively non-magnetic material adapted to be moved axially in opposite directions, a magnetic device disposed within the tube and providing a permanent magnetic flux field extending through the tube to the exterior thereof, said magnetic device comprising a plurality of flat magnetic elements, each polarized in the direction of its thickness and assembled together to provide over-all polarization in a general direction laterally of the axis of the tube, and switch means adjacent the tube and exterior of the same, said switch means being responsive to the magnetic flux field of the magnetic device for operating the same.

2. In electrical positioning apparatus, a tube made of relatively non-magnetic material adapted to be moved axially in opposite directions, a magnetic device disposed within the tube and providing a permanent magnetic flux field extending through the tube to the exterior thereof, a bar extending axially of the tube, a closure secured to one end of the tube and to the corresponding end of the bar, means for adjustably securing the magnetic device to the bar whereby the position of the device on the bar can be adjusted in the direction of the axis of the tube, and switch means adjacent the tube and exterior of the same, said switch means being responsive to the magnetic flux field of the magnetic device for operating the same.

3. In apparatus applicable to valves, a hydraulic cylinder and piston for the power operation of a valve, a tube of relatively non-magnetic material having one end thereof extending into the hydraulic cylinder and attached to the piston, at least one magnetic device disposed within the tube and movable together with the same, said magnetic device comprising a plurality of magnet elements assembled together to provide a permanent magnetic flux field extending to the exterior of the tube and polarized in a direction laterally to the axis of the tube, and at least one switch of the magnetic reed type mounted upon the hydraulic cylinder and disposed adjacent said tube, said switch being operated by movement of the tube to bring said magnetic device into proximity with the same.

4. Apparatus as in claim 3 together with a closure cap secured to the exterior end of the tube, a bar secured to said cap and extending axially within the tube, and means for adjustably securing the magnetic device to the bar whereby the position of the device on the bar can be adjusted in the direction of the axis of the tube.

References Cited

UNITED STATES PATENTS

| 341,981 | 5/1886 | Woolson | 335—229 |
| 2,419,942 | 5/1947 | Brewer | 200—81.9 |
| 2,976,378 | 3/1961 | Goddard | 200—61.45 |
| 3,271,708 | 9/1966 | McCormick | 200—47 |

BERNARD A. GILHEANY, *Primary Examiner.*

H. BROOME, *Assistant Examiner.*